(12) United States Patent
Musser

(10) Patent No.: US 9,573,010 B1
(45) Date of Patent: Feb. 21, 2017

(54) METHODS FOR THE NEUTRALIZATION, SOLIDIFICATION, OR STABILIZATION OF ACID WASTE

(71) Applicant: Rice Environmental, Inc., Amarillo, TX (US)

(72) Inventor: David T. Musser, Amarillo, TX (US)

(73) Assignee: Rice Environmental, Inc., Amarillo, TX (US)

( * ) Notice: Subject to any disclaimer, the term of this patent is extended or adjusted under 35 U.S.C. 154(b) by 0 days.

(21) Appl. No.: 14/977,160

(22) Filed: Dec. 21, 2015

(51) Int. Cl.
| | | |
|---|---|---|
| *B01J 23/85* | (2006.01) |
| *A62D 3/36* | (2007.01) |
| *A62D 3/33* | (2007.01) |
| *A62D 101/47* | (2007.01) |

(52) U.S. Cl.
CPC . *A62D 3/36* (2013.01); *A62D 3/33* (2013.01); *A62D 2101/47* (2013.01)

(58) Field of Classification Search
CPC ........................................................ B01J 23/85
USPC ............................................................. 588/315
See application file for complete search history.

(56) References Cited

U.S. PATENT DOCUMENTS 4,514,307 A * 4/1985 Chestnut .................. A62D 3/33
106/697

* cited by examiner

*Primary Examiner* — Edward Johnson
(74) *Attorney, Agent, or Firm* — Dentons US LLP

(57) ABSTRACT

A process for neutralizing and for controlling acid gas emissions during the neutralization, solidification, or stabilization of acidic waste products in liquids, sludge, or soil, resulting from the acid treatment of petroleum products.

18 Claims, 3 Drawing Sheets

METHODS FOR THE NEUTRALIZATION, SOLIDIFICATION, OR STABILIZATION OF ACID WASTE

FIELD OF THE INVENTION

The principles of the present invention relate generally to the field of environmental remediation. In particular, methods for the neutralization, solidification, or stabilization of acidic waste products in soil, sludge or waste products at a contaminated site are provided. The present invention also relates to the reduction of sulfur dioxide emissions while disturbing, moving, or remediating media contaminated with acidic waste products.

BACKGROUND OF THE INVENTION

Petroleum refining begins with the distillation or fractionation of crude oils into separate hydrocarbon groups. The resultant products are directly related to the characteristics of the crude processed. Most distillation products are further converted into more usable products by changing the size and structure of the hydrocarbon molecules through cracking, reforming, and other conversion processes. These converted products are then subjected to various treatment and separation processes such as extraction, hydro-treating, and sweetening to remove undesirable constituents and improve product quality.

Treating petroleum products with acid is a procedure that has been used for more than a century in the petroleum industry. Until circa 1930, acid treatment was almost universal for all types of petroleum products, especially for cracked gasoline, kerosene, and lubricating stocks. Various acids have been used, but sulfuric acid is the most advantageous. The reactions of sulfuric acid with petroleum fractions are complex. The undesirable components to be removed are generally present in small amounts, requiring large excesses of acid for efficient removal.

Sludge produced from the acid treatment of petroleum distillates, even gasoline and kerosene, is complex in nature. Esters and alcohols are present from reactions with olefins; sulfonation products from reactions with aromatics, naphthenes, and phenols; and salts from reactions with nitrogen bases. In addition, naphthenic acids, sulfur compounds, and asphaltic material are all retained by direct solution. Added to the mix are various products of oxidation-reduction reactions, such as coagulated resins, soluble hydrocarbons, water, and free acid.

The waste product that remained behind after filtration was customarily disposed of in open lagoons. The physical and chemical characteristics of this sludge generally vary with depth and from lagoon to lagoon. Sludge resulting from the treatment of gasoline and kerosene, so-called light oils, separates as a tar-like material. Sludge from heavy oil and bitumen, however, separates as granular semisolids. After decades within these lagoons, the materials range from a solid, charcoal-like material at the bottom to a liquid mixture of sulfuric acid, other acidic waste products, and rainwater at the surface. At other times these lagoons can be very heterogeneous with various stratifications of acidic waste materials.

Treating these acidic waste products is difficult due to a number of factors. First, as previously described, the waste is very complex. As understood in the art, the waste composition varies from one area of a lagoon to another, and often from one depth to another within the same area in a lagoon. Second, the acid content of the waste also varies. As an example, the acid content of the waste most often ranges from less than one to fifty percent, however, some highly acidic waste consists of as much as ninety percent acidity. Third, when these acidic materials are disturbed, dangerously high concentrations of acid gases can be emitted, primarily sulfur dioxide and, to a much lesser extent, hydrogen sulfide.

Conventional methods for remediation of highly contaminated acidic waste sites is inefficient, ineffective, dangerous, and costly. Typically, remediation efforts begin by measuring the pH of the waste at a few points throughout the contamination site. Samples of the waste are then taken and the amount of neutralization reagent is determined using empirical methods of trial and error. As known in the art, many of the contamination sites remain untreated due to ineffective measurement and treatment processes currently available. For example, if insufficient neutralizing agent is applied, sites generally require re-treatment even after the pH has increased following an initial treatment due to the delayed ionization of certain acid contaminants. More problematic situations arise because current measurement and treatment protocols are often grossly inadequate for handling highly contaminated acidic waste sites, thereby emitting dangerous acid gases. Such sites typically require evacuation or costly containment efforts when gases are emitted during waste disturbing remediation activities. It is well known that contracts to remediate such sites have been breached or go unfulfilled due to financial exposure and other liabilities that result for failing to suitably remediate a contaminated site. A commercially-viable means to safely and efficiently treat these acidic wastes without emitting dangerously high concentrations of acid gases is needed.

BRIEF SUMMARY OF THE INVENTION

Among the various aspects of the present disclosure is the provision of methods for the controlling sulfur dioxide gas emissions during the neutralization, solidification, or stabilization of acidic waste products resulting from the sulfuric acid treatment of petroleum products.

One aspect of a method of remediating acidic waste products at a contaminated site may include measuring acidity of the waste at the contaminated site. In another embodiment, the method includes mapping the measured acidity levels of multiple, distinct sub-plots of the contaminated site. In yet another embodiment, the method includes determining the acid neutralization capacity of candidate neutralization agents. In one embodiment, the method includes calculating an amount of neutralization agent to raise the pH of the waste in the sub-plots to a pH range of 4.0 to 12.5. In still another embodiment, the method includes applying a first amount of neutralization agent to a first sub-plot of the contaminated. In other embodiments, the method includes mixing the first amount of neutralization agent into the first sub-plot of the contaminated site at a first depth. In yet other embodiments, the method includes repeating applying and mixing at the first sub-plot of the contaminated site from the first depth to a first maximum depth. In certain embodiments, the method includes applying a second amount of neutralization agent to a second sub-plot of the contaminated. In some embodiments, the method includes mixing the second amount of neutralization agent into the second sub-plot of the contaminated site at a second first depth. In particular embodiments, the method includes repeating applying and mixing at the second sub-plot of the contaminated site from the second first depth to a second maximum depth. In other embodiments, the method includes neutralizing the pH of the waste at the contaminated site.

In some embodiments, the method includes applying neutralizing agent on top of the first sub-plot before mixing. In certain embodiments, the sub-plots include a surface area less than about 10,000 square feet. In particular embodiments, the neutralization agent includes an alkaline slurry.

In certain embodiments, the method includes measuring the moisture content of the waste. In one embodiment, the method includes measuring the density of the waste. In some embodiments, the method includes mixing a first amount of a pozzolanic or cementitious material into the pH neutralized waste at the contaminated site, thereby solidifying at least the pH neutralized first portion of the contaminated site. In other embodiments, the first amount of pozzolanic or cementitious material is a function of the acidity, moisture content and density of the waste. In yet other embodiments, the method includes extracting the solidified pH neutralized first portion of the contaminated site. In another embodiment, the alkaline slurry comprises hydrated lime $(Ca(OH)_2)$.

Another aspect of a method of reducing sulfur dioxide emissions from acidic waste at a contaminated site may include measuring acidity of the acidic waste at the contaminated site. In particular embodiments, the method includes mapping measured acidity levels of multiple, distinct sub-plots of the contaminated site. In another embodiment, the method includes determining the acid neutralization capacity of candidate neutralization agents. In yet another embodiment, the method includes applying a first amount of neutralization agent on top of a first sub-plot of the contaminated site, the first amount being a function of the mapped acidity level at the first sub-plot of the contaminated site. In yet another embodiment, the method includes forming at least one groove at a first depth into the first sub-plot of the contaminated site while simultaneously applying a second amount of neutralization agent, the second amount being determined as a function of the mapped acidity level at the first sub-plot of the contaminated site. In other embodiments, the method includes repeating forming while simultaneously applying at the first sub-plot of the contaminated site from the first depth to a first maximum depth. In yet other embodiments, the method includes neutralizing the pH of the first sub-plot of the contaminated site. In particular embodiments, the neutralization agent includes an alkaline slurry. In other embodiments, the alkaline slurry comprises hydrated lime $(Ca(OH)_2)$.

In certain embodiments, the method includes measuring the moisture content of the waste. In one embodiment, the method includes measuring the density of the waste. In other embodiments, the method includes mixing a first amount of a pozzolanic or cementitious material into at least the pH neutralized soil of the contaminated site, thereby solidifying the pH neutralized waste of the contaminated site. In yet other embodiments, the first amount of pozzolanic or cementitious material is a function of the moisture content and density of the waste. In particular embodiments, the method includes extracting the solidified pH neutralized waste of the contaminated site.

BRIEF DESCRIPTION OF THE DRAWINGS

Illustrative embodiments of the present invention are described in detail below with reference to the attached drawing figures, which are incorporated by reference herein.

DETAILED DESCRIPTION OF THE INVENTION

Figure 1:
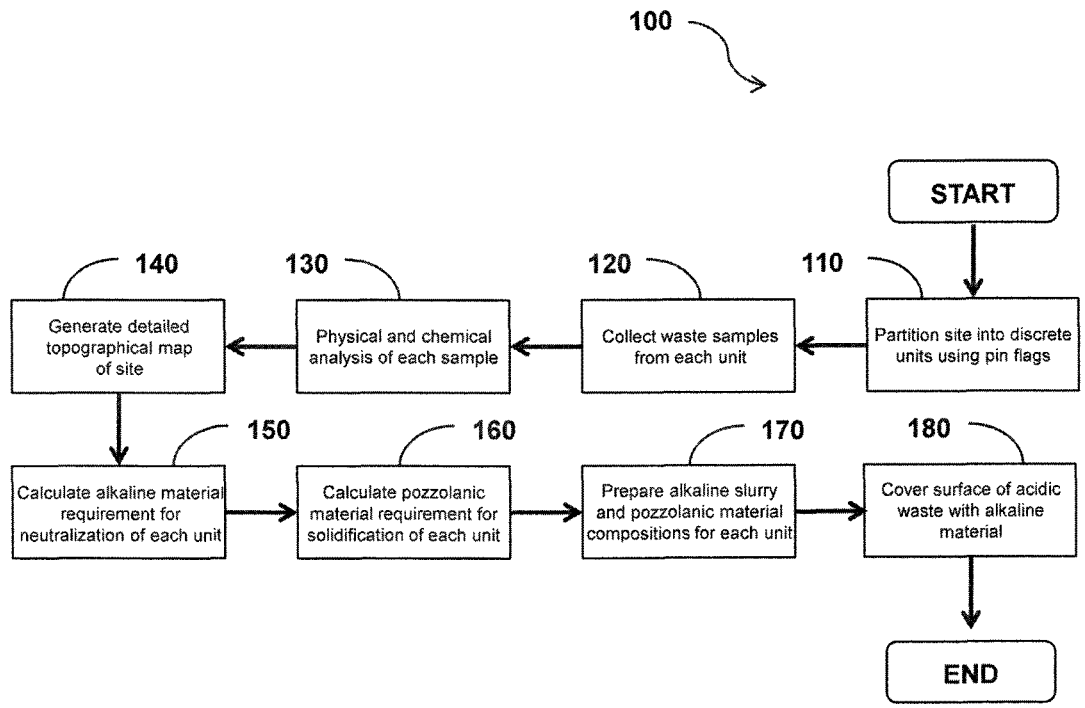
FIG. 1 is a flow diagram of an illustrative process for the preparation and controlling of sulfur dioxide gas emissions during the neutralization, solidification, or stabilization of acidic waste products.

Certain petroleum refining treatment processes, such as alkylation, use sulfuric acid or hydrofluoric acid to produce high-octane components for gasoline blending. Petroleum product treating is another process that commonly employs vast excesses of sulfuric acid to remove unsaturated hydrocarbons, sulfur, nitrogen, and other compounds during petroleum refining.

A consequence of these and other petroleum refining practices is the pollution of both local and distal environments with sulfuric acid and related acid waste products. For example, acid waste liquid catchments can leach sulfuric acid which migrate through subterranean strata and underground waterways to contaminate other areas. This pollution of soils or bodies of water with high concentrations of sulfuric and related acids can have adverse effects on humans or other organisms. Therefore, many industries find themselves in a position where their liquid, slurry, or solid acidic waste products must be converted into a form that both retains any toxic components and neutralizes the pH.

For instance, an aqueous liquid or semi-liquid acidic waste material can be both neutralized, solidified or stabilized by mixing appropriate amounts of a neutralizing agent and a pozzolanic or cementitious material. Use of such waste solidification or stabilization procedures and apparatus is described, for example, in U.S. Pat. Nos. 3,980,558; 4,226, 630; 4,338,134; and 4,652,180, which are incorporated herein by reference in their entirety.

Practice herein of the described embodiments employs the concept of neutralizing, solidifying or stabilizing various forms of acidic waste products resulting from the sulfuric acid treatment of petroleum products. More specifically, an in situ pH neutralization and subsequent solidification or stabilization of the standing bodies of liquids and solids in waste liquid catchments such as, for example, sludge pits, settling ponds may be utilized to neutralize, solidify or stabilize various forms of acidic waste products.

I. Site Analysis and Preparation

One embodiment for treating acidic waste provides a method for remediating acidic waste products in liquid waste, sludge, or soil at a contaminated site. Another embodiment for treating acidic waste provides a process for reducing acid gas emissions from a contaminated site during the remediation of acidic waste products in liquid waste, sludge, or soil. In one embodiment, the process involves i) measuring acidity of the waste at a contaminated site; ii) mapping measured acidity levels across the contaminated site; iii) applying a first amount of neutralization agent on top of a first sub-plot of the contaminated site; iv) forming at least one groove at a first depth into the first sub-plot of the contaminated site while simultaneously applying a second amount of neutralization agent as a function of the mapped acidity level at the first sub-plot of the contaminated site; v) repeating forming while simultaneously applying at the first sub-plot of the contaminated site from the first depth to a first maximum depth; and vi) neutralizing the pH of the first sub-plot of the contaminated site.

In conventional environmental engineering practice and clean-up, remediation of acidic waste at a contaminated site begins with a topographical analysis of the pH level throughout the work site. The pH level at each portion sampled throughout the work site is used to estimate the amount of neutralizing agent to be used at that portion to raise the pH of that portion to a more neutral or basic pH ranging from about 4.0 to about 12.5 or about 7.0 to about 12.5.

In situations where the acidic waste contaminated site is polluted with high concentrations of sulfuric or related acids, additional equipment and safety concerns arise. For instance, high concentrations of sulfuric or sulfonic acids in contaminated media can result in the release of sulfur dioxide gas upon disturbance or aeration of the polluted media that occurs during a standard remediation project. Acid gas emissions concentrated enough to pose a significant human health hazard typically necessitate the use of additional equipment and work site preparation to avoid exposure risk to workers and the public. For example, areas of the contaminated work site under remediation may be covered with a tent or other enclosed structure employing air filtration and workers must utilize supplied breathing air or wear respirators and other appropriate protective equipment. Not surprisingly, such work site conditions and preparations significantly increase the time, cost, and safety hazards for such a remediation project and alternative methodologies are needed.

A. Contaminated Site Topography

Unlike conventional acidic waste remediation, which proceeds based on a pH analysis or limited acidity analysis of the contaminated site, the methodologies presented herein employ a more detailed initial physical and chemical analysis of the polluted site.

FIG. 1 illustrates a flowchart of a method 100 for the preparation and controlling of sulfur dioxide gas emissions during the neutralization, solidification, or stabilization of acidic waste products from a contaminated site. The method 100 begins at step 110 by partitioning or sub-dividing the contaminated work site into smaller plots or sub-units using standard surveying techniques or markers, such as pin flags. Generally, the levels of acidic waste contamination can vary widely throughout a site and, as a result, the amount of neutralizing and solidifying agents necessary to properly treat the whole site will vary between different points of the site. In some embodiments, the work site sub-plots can be from about 100 to about 10,000 sq/ft depending on waste heterogeneity. Vertical sampling frequency can also range from 3 inch increments to 120 inch increments depending on waste heterogeneity.

At step 120, waste samples are collected from each sub-plot for a physical and chemical analysis 130. Waste samples can be collected from adjacent sub-plots, a random distribution of sub-plots, or a combination thereof. The waste samples are used to determine how that sub-plot is to be remediated. Once the physical and chemical properties of the contaminated work site samples have been determined 130, the data can be compiled to generate a representative data base or detailed topographical map of the entire work site 140 which will dictate how remediation of the whole site will proceed. Alternatively, in cases where the acid waste site is not fully accessible for sampling prior to the commencement of treatment due to physical or safety limitations, each sub-plot is sampled and analyzed prior to treatment as accessibility to each discrete area is gained.

B. Physical and Chemical Waste Analysis

At step 120, waste samples are collected from each sub-plot for a physical and chemical analysis 130. In particular embodiments, waste samples are analyzed 130 for pH, titratable acidity (TA), moisture content, and density. pH for acidic waste may range, for example, from less than 1.0 to about 5.0. Moisture content for acidic waste may range, for example, from about 5% to about 95%. Titratable acidity for acidic waste may range, for example, from about 0.5% to about 90%. Density may range, for example, from about 63 lbs/cf to about 95 lbs/cf.

There are two interrelated concepts in waste site analysis that relate to acidity: pH and total acidity. Each of these quantities is analytically determined in separate ways and each has its own particular impact on how a particular waste site is remediated. The total acidity of a solution is a measure of all the hydrogen ions ($H^+$) of both the fixed and volatile acids present, including the potential hydrogen ions able to be released, plus the hydrogen ions already released and existing as free hydrogen ions in solution. Thus, total acidity is the proton equivalence of the amount of organic acid anions present in a solution; it is the number of protons (i.e., hydrogen ions) that the organic acids would contain if undissociated. Total acidity can be determined by measuring the acid anion concentration by spectrometry or chromatography.

Alternatively, the titratable acidity of a solution is an approximation of the total acidity in a solution. Titratable acidity is measured by reacting the acids present in a sample with a base (e.g., sodium hydroxide (NaOH)) to a chosen end point, close to neutrality, as indicated by an acid sensitive color indicator or pH meter. Total acidity and titratable acidity are not synonymous. The titratable acidity is always less than the total acidity because, in practice, not all hydrogen ions expected from acids are found during the determination of titratable acidity.

By contrast, pH only measures the free hydrogen ions in solution. Therefore, two different acidic waste samples can have the same pH but significantly different total acidity or titratable acidity. For at least this reason, total acidity and titratable acidity allows for a much more accurate prediction of the amount of neutralizing agent required to sufficiently raise the pH of the acidic waste sample to within environmentally safe standards.

C. Neutralization and Solidification Material

At step 150, based on the titratable acidity as measured in step 130, the amount of neutralizing agent to adequately raise the pH of an acidic waste sub-plot may be accurately calculated. The amount of neutralization agent required to neutralize the acid waste is dependent upon the total acidity of the waste and the acid neutralization capacity of the agent being utilized. In one embodiment, the acid neutralization capacity of a candidate neutralization agent is determined by the Generalized Acid Neutralization Capacity Test (GANC; Environment Canada Method No. 7), which is incorporated herein by reference. Once the acidity of the waste and the GANC of the candidate neutralization agents have been determined, the amount of each candidate neutralization agent required to neutralize the acidic waste can be calculated and a particular neutralization agent selected based on a cost-effective analysis.

Any suitable agent or process capable of modifying or neutralizing the sulfuric acid waste present at a contaminated site can be used in accordance with the principles described herein. A variety of neutralizing agents are available to increase the pH of acid waste to acceptable levels and neutralize existing acidity. Factors to consider when choosing a neutralizing agent include availability, solubility, pH, acid neutralization capacity, handling requirements, and cost, In one embodiment, the neutralizing agent is alkaline, such as hydrated lime ($Ca(OH)_2$), sodium bicarbonate ($NaHCO_3$), Portland cement, or byproduct materials such as flyash, cement kiln dust, lime kiln dust or similar byproducts that contain calcium oxide, calcium carbonate, or calcium hydroxide. Neutralizing agents for treating acidic waste contamination should be alkaline, with a pH ranging from 8.0 to 12.5.

The amount of the neutralizing agent may vary, as would be understood by one of skill in the art. In one embodiment, the neutralizing agent is about 1% to about 90% on an acidic waste dry weight basis. In one embodiment, the addition of the neutralization agent increases the pH of the acidic waste from about 0.1, about 0.2, about 0.3, about 0.4, about 0.5, about 0.6, about 0.7, about 0.8, about 0.9, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, to about 12.5 pH units.

At step 160, based on the moisture content and density as measured in step 130, the amount of pozzolanic or cementitious material required to adequately solidify an acidic waste sub-plot can also be accurately calculated. The calculated amount of pozzolanic or cementitious agent required can be verified via laboratory testing so as to determine if the chemical composition of the waste contains any compounds that would interfere with or retard solidification or stabilization reactions. In certain embodiments, the waste can be in a liquid or semi-liquid form. In other embodiments, the addition of a solidification reagent can create a solid or soil-like material. In yet other embodiments, the addition of a solidification reagent can improve other physical characteristics of the waste, such as permeability or compressive strength. In some embodiments, neutralized acid wastes that are soil-like can also be treated with pozzolans or other cementitious materials to improve durability or permeability.

Pozzolans are silicate-based materials which, by themselves, may or may not possess cementitious value, but which, in the presence of water, react chemically at ambient temperature with calcium hydroxide to form compounds possessing cementitious properties. In certain embodiments, pozzolans are ideal because they are less prone than Portland cement to form ettringite or other non-desirable minerals such as thaumasite or salt crystals that may impact the strength of the solidified waste over time. Also, ettringite formation is expansive and tends to swell the volume of the treated waste.

At step 170, the neutralizing and solidifying agents are separately prepared accordingly to the calculated requirements necessary for neutralization, solidification, or stabilization of each acidic waste sub-plot for the entire contaminated site 150, 160. Following completion of these steps 110-170 as discussed above, the prepared alkaline slurry 170 may be used to cover the surface of the first acidic waste sub-plot and the remediation process begins.

II. Acidic Waste Treatment

The principles described herein relate to process for processing acidic waste. In one embodiment, the process includes i) measuring acidity of the waste at a contaminated site; ii) mapping measured acidity levels across the contaminated site; iii) applying a first amount of neutralization agent to a first portion of the contaminated site as a function of the mapped acidity level at the first portion of the contaminated site; iv) mixing the first amount of neutralization agent into the first portion of the contaminated site at a first depth; v) repeating applying and mixing at the first position of the contaminated site from the first depth to a first maximum depth; vi) applying a second amount of neutralization agent to a second portion of the contaminated site as a function of the mapped acidity levels at the second position of the contaminated site; vii) mixing the second amount of neutralization agent into the second position of the contaminated site at a second first depth; viii) repeating applying and mixing at the second portion of the contaminated site from the second first depth to a second maximum depth; and ix) neutralizing the pH of the waste at the contaminated site. In some embodiments, repeating and applying mixing may include repeatedly digging into the sub-plot at about 3, about 6, about 9, about 12, about 18, or about 24-inch intervals from the first or second maximum depths.

Figure 2:
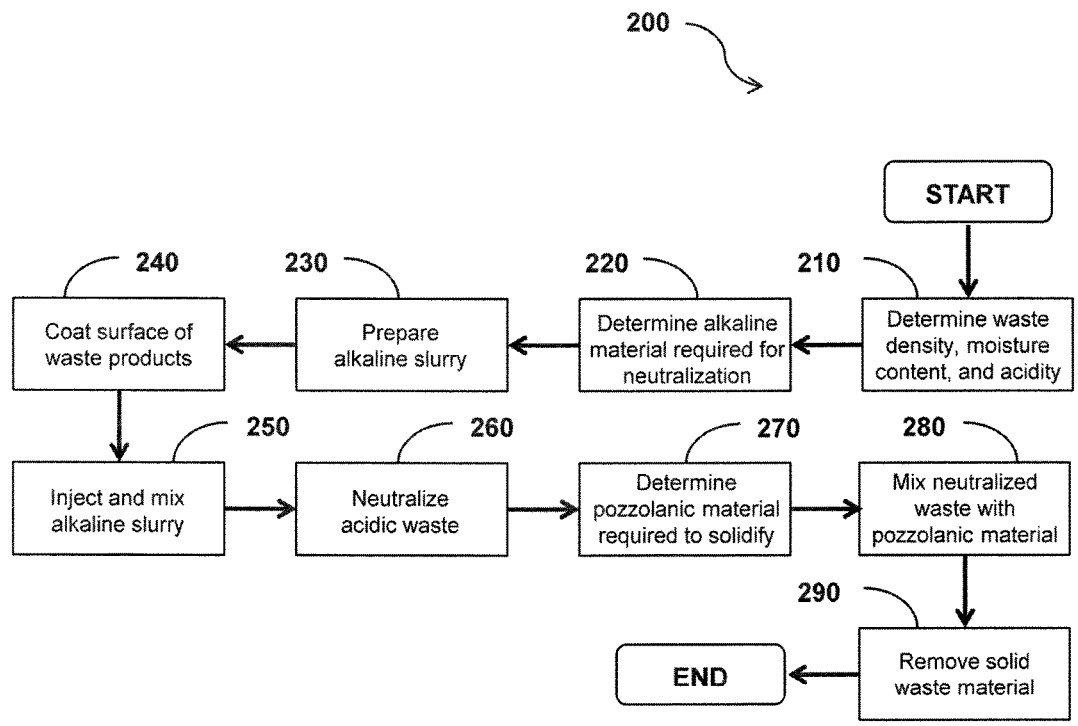
FIG. 2 is a flow diagram of a more detailed illustrative process for neutralizing acidic waste from a contaminated site.

FIG. 2 illustrates a flowchart of an illustrative process 200 for neutralizing acidic waste products from a contaminated site. The process 200 may start at step 210 with a physical and chemical analysis to determine pH, titratable acidity, moisture content, and density throughout the acidic waste contaminated site. At step 220, the pH and titratable acidity data 210 may be used to calculate the amount of neutralizing agent required to adequately raise the pH of the acidic waste to acceptable environmental standards for remediation. At step 230, the required alkaline slurry may be prepared and then applied to the surface of the acidic waste products 240 to control any sulfur dioxide emissions. At step 250, the acidic waste products below the surface are neutralized by injecting and mixing the prepared alkaline slurry 230 into the acidic waste until the acidic waste is pH neutralized or alkaline 260. At step 270, the moisture content and density data 210 is used to calculate the amount of pozzolanic or cementitious material for use in adequately solidifying the acidic waste to contain and confine any other contaminants as well as facilitate transport of the neutralized acidic waste. At step 280, the pozzolanic or cementitious material may be prepared and then mixed with the neutralized acidic waste products 280 before removing the now remediated acidic waste material from the contaminated site 290. In some embodiments, the treated waste will not be removed from the site and can be controlled by an engineered cap or cover.

Figure 3:
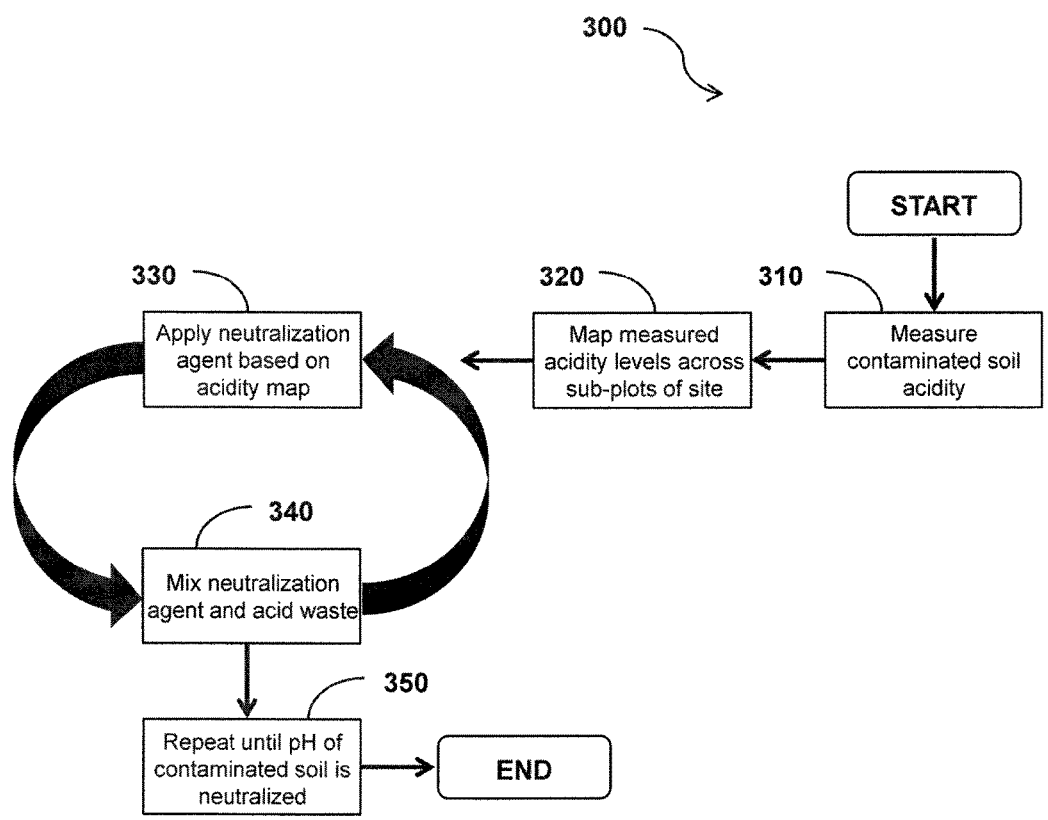
FIG. 3 is a flow diagram of an illustrative process for controlling sulfur dioxide gas emissions during the neutralization, solidification, or stabilization of acidic waste from a contaminated site.

FIG. 3 illustrates a is a flowchart of an illustrative process 300 for controlling sulfur dioxide gas emissions during the neutralization, solidification, or stabilization of acidic waste from a contaminated site. The process 300 may start at step 310 with a measurement of waste acidity at an acidic waste contaminated site. In particular embodiments, the contaminated site is sub-divided into sub-plots for easier analysis. In some embodiments, waste acidity may be measured in sub-plots at intervals of about 5 feet, 10 feet, 15 feet, 25 feet, 50 feet, or 100 feet at the contaminated site. In other embodiments, waste acidity may be measured at various depths throughout the contaminated site. For instance, soil acidity may be measured in sub-plots at internals of about 1 foot, 2 feet, 3 feet, 4 feet, 5 feet, or 10 feet below the surface of the contaminated site.

At step 320, the acidity data 310 may be compiled to generate a detailed topographical map or database of the entire acidic waste contaminated site. At step 330, the acidity as measured at a particular point or sub-plot at the contaminated site 320 is used to calculate and apply an amount of neutralizing agent required to adequately raise the pH of the contaminated soil at that point or sub-plot to within acceptable environmental standards for remediation. In one embodiment, the neutralizing agent is hydrated lime, flyash, cement kiln dust, lime kiln dust, or similar alkaline product or byproduct.

At step 340, the neutralizing agent 330 is mixed with the acidic waste in the contaminated soil. At step 350, steps 330 and 340 and repeated until the pH of the contaminated waste is neutralized to within acceptable environmental standards for remediation or until a specific pH is reached.

III. Emission Control of Noxious Gases

In one aspect, the present invention provides methods for alkaline scrubbing and reduction of sulfur dioxide ($SO_2$) emissions. In some embodiments, an alkaline slurry is sprayed on the surface of the waste at an acid waste contamination site.

Noxious gas emissions present a significant problem for the remediation of sites contaminated by acidic waste. In particular, when exposed to air, acidic waste can emit high concentrations of acid gases which complicates any remediation efforts significantly in time, money, and safety. In one embodiment, waste products containing sulfuric acid emit low to high levels of sulfur dioxide. In some embodiments, sulfur dioxide flux rates from sulfuric acid wastes can be from 5 mg/hr/m$^2$ to 500 mg/hr/m$^2$. In other embodiments, in the immediate area of acid waste remediation, atmospheric concentrations of sulfur dioxide can be from less than 1.0 ppm to greater than 500 ppm. When sulfur dioxide levels are at less than 1.0 ppm, additional safety requirements are generally not required. However, sulfur dioxide levels greater than 100 ppm are generally considered immediately dangerous to life and health. High levels of atmospheric sulfur dioxide can necessitate the use of supplied breathing air for all personnel in the area.

Sulfur dioxide ($SO_2$) is a colorless gas with a strong odor and the primary source of acid rain. Sulfur dioxide can easily and rapidly enter the bloodstream of a person through the lungs, and exposure to high levels of sulfur dioxide has adverse effects on pulmonary function and can be life-threatening.

Currently, remediation of highly contaminated acidic waste sites employ the construction of large, enclosed surface structures to contain and filter sulfur dioxide gas emissions resulting from the disturbance of acidic waste products during standard treatment operations. Surprisingly, the surface coating of acidic waste products with alkaline Amy 240, prior to injection and mixing of additional neutralization agents into the sub-surface acidic waste products 250, dramatically reduces the emission of sulfur dioxide gas at such highly contaminated sites. Without being limited by theory, one hypothesize is that an alkaline slurry comprising lime, for example, reacts with sulfur dioxide gas to form solid calcium sulfite: $SO_2+Ca(OH)_2 \rightarrow CaSO_3+H_2O$. The sulfite may be then be air-oxidized to form calcium sulfate dihydrate (or gypsum), which is relatively inert: $2CaSO_3+O_2 \rightarrow 2CaSO_4$ where $CaSO_4+2H_2O \rightarrow CaSO_4 \cdot 2H_2O$.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1

Site Preparation

The amount of alkaline material used to neutralize waste acids at a contaminated site can be optimized, while minimizing the overall volume of treated material, by limiting chemical reactions that produce expansive compounds, such as ettringite, thaumasite, chloroaluminates, and salt crystals.

First, a topography of the contaminated site is developed, as described in FIG. 1. This can be accomplished by dividing the site into discrete sub-sections using standard surveying methods or markers such as pin flags and a detailed description or representation projected onto a map. Second, data comprising the waste density, moisture content, and acidity may be collected in each sub-section and recorded over a range of depths. Typically, these values vary throughout the site, thus presenting a significant challenge for proper neutralization of the acidic waste. Accurately determining these variables enables the calculation of i) alkalinity for use in neutralizing the acidic waste, ii) water within the system, iii) expected water content after neutralization, and iv) pozzolanic or cementitious material for use in hydrating the moisture in the system.

Example 2

Determining Acidity

Standard Method 2310, incorporated herein by reference, can be used to determine the acidity of the media at a contaminated site.

Example 3

Determining Density

Active Standard ASTM D 5057, incorporated herein by reference, can be used to determine acidic waste product density.

Example 4

Determining Moisture Content

Active Standard ASTM D 2166 or EPA Method 1684, incorporated herein by reference, can be used to determine acidic waste product moisture content.

Example 5

Site Pre-Treatment

To minimize the emissions of acid gases, primarily sulfur dioxide, that occur when acidic waste is disturbed, an alkaline slurry is spread on the surface of the acidic waste and functions as a chemical scrubber for the removal of sulfur dioxide gas. As a result, exposure of treatment crews and workers is significantly reduced and the extensive time, cost, and safety equipment for use in reducing or eliminating the emission of acid gases in a typical operation are also reduced.

An alkaline slurry can comprise a hydrated lime slurry ($Ca(OH)_2$) with 5 to 40% solids content by weight. The slurry could also be generated by other manufactured or by-product materials that have a CaO component.

Example 6

Neutralization, Solidification, and Extraction

In exemplary embodiments, after the acidic waste surface is coated with a layer of alkaline slurry, a backhoe (or similar heavy machinery) equipped with an implement designed to cut furrows into the waste may be used. Cutting furrows into the waste, while simultaneously filling or injecting them with additional alkaline slurry, minimizes the surface area from which acid gases can emanate. Further, by injecting the acidic waste with a pre-calculated amount of alkaline slurry, the waste may be neutralized. The amount of alkaline slurry used to neutralize a sub-section of a contaminated waste site may be calculated based on the data obtained in Example 1.

Exemplary Calculations

Quicklime Hydration $$CaO + H_2O \rightarrow Ca(OH)_2$$

CaO=quicklime
$Ca(OH)_2$=hydrated lime (lime)
Calculate ratios of reactants

| Element | At. Wt. | No. of Atoms | Total Wt. |
|---|---|---|---|
| Ca | 40.078 | 1 | 40.078 |
| O | 15.9994 | 1 | 15.9994 |
| CaO | | | 56.0774 |
| Ca | 40.078 | 1 | 40.078 |
| O | 15.9994 | 2 | 31.9988 |
| H | 1.00794 | 2 | 2.01588 |
| $Ca(OH)_2$ | | | 74.09268 |

$$\frac{M_{lime}}{M_{quicklime}} = \frac{74.09268}{56.0774} = 1.3213$$

$M_{Ca(OH)_2} = M_{lime}$ = mass of lime
$M_{CaO} = M_{quicklime}$ = mass of quicklime Acid-Base (Neutralization) Reaction $$H_2SO_4 + Ca(OH)_2 \rightarrow CaSO_4 + 2H_2O$$

Calculate ratios of reactants

| Element | At. Wt. | No. of Atoms | Total Wt. |
|---|---|---|---|
| H | 1.00794 | 2 | 2.01588 |
| S | 32.065 | 1 | 32.065 |
| O | 15.9994 | 4 | 63.9976 |
| $H_2SO_4$ | | | 98.07848 |
| Ca | 40.078 | 1 | 40.078 |
| O | 15.9994 | 2 | 31.9988 |
| H | 1.00794 | 2 | 2.01588 |
| $Ca(OH)_2$ | | | 74.09268 |

$$\frac{M_{H_2SO_4}}{M_{Ca(OH)_2}} = \frac{M_{acid}}{M_{lime}} = \frac{98.07848}{74.09268} = 1.323727$$

$M_{H_2SO_4} = M_{acid}$ = mass of acid
$M_{Ca(OH)_2} = M_{lime}$ = mass of base lime Use data obtained from Example 1 and the ratio of reactants to calculate the amount of alkaline slurry needed to neutralize a sub-section of contaminated waste.

Determine volume of sub-section of contaminated waste $$V_{waste} = l \times w \times d$$

$V_{waste}$ = volume of waste
l = length
w = width
d = depth

Determine mass of waste $$M_{waste} = V_{waste} \times \gamma_{waste}$$

$\gamma_{waste}$ = unit weight of waste
$M_{waste}$ = mass of waste

Determine mass of acid $$M_{acid} = M_{waste} \times C_{acid}$$

$C_{acid}$ = concentration of acid

Determine mass of base (lime)

$$\frac{M_{acid}}{M_{lime}} = 1.323727 \therefore M_{lime} = \frac{M_{acid}}{1.323727}$$

Calculate mass of slurry and of lime in slurry $$M_{slurry} = \frac{M_{lime}}{C_{lime}} \therefore M_{lime} = M_{slurry} \times C_{lime}$$

$M_{slurry}$ = mass of slurry
$C_{lime}$ = solids (lime) concentration of slurry Calculate density of slurry $$\rho_{slurry} = \frac{100}{\left(\frac{C_{lime}}{\rho_{lime}} + \frac{100 - C_{lime}}{\rho_{water}}\right)}$$

$\rho_{slurry}$ = density of slurry (lb/ft$^3$, kg/m$^3$)
$\rho_{lime}$ = density of slurry (lb/ft$^3$, kg/m$^3$)
$\rho_{water}$ = density of water (lb/ft$^3$, kg/m$^3$)

Calculate volume of slurry $$M_{slurry} = V_{slurry} \times \rho_{slurry} \therefore V_{slurry} = \frac{M_{slurry}}{\rho_{slurry}}$$

Sample
Inputs
Subsection is 10 ft (wide), 20 ft (length) and 5 ft (depth)
Unit weight of waste = 81.5 lbs/ft$^3$
Acid content of waste = 10%
Solids content of slurry = 30%
Calculate the mass of slurry for the sub-section.

$$M_{slurry} = \frac{\frac{l \times w \times d \times \gamma_{waste} \times C_{acid}}{1.323727}}{C_{lime}}$$

$$M_{slurry} = \frac{\frac{20\ ft_{waste} \times 10\ ft_{waste} \times 5\ ft_{waste} \times \frac{81.5\ lbs_{waste}}{ft^3_{waste}} \times \frac{10\ lbs_{acid}}{100\ lbs_{waste}}}{1.323727\ \frac{lbs_{acid}}{lbs_{lime}}}}{\frac{30\ lbs_{lime}}{100\ lbs_{slurry}}}$$

$M_{slurry} = 20,500\ lbs_{slurry}$

Calculate the volume of slurry for sub-section $$\rho_{slurry} = \frac{100}{\left(\frac{30}{2300\ kg/m_3} + \frac{100-30}{1000\ kg/m^3}\right)} =$$

$$\frac{100}{0.013\ m^3/kg + 0.07\ m^3/kg} = \frac{100}{0.083\ m^3/kg} :$$

$$\rho_{slurry} = \frac{1204\ kg}{m^3} \times \frac{2.20462\ lbs}{kg} \times \frac{1\ m^3}{264.172\ gal} = 10.05\ lbs/gal$$

$$V_{slurry} = 20,500\ lbs_{slurry} \times \frac{1\ gal}{10.05\ lbs} = 2,040\ gal_{slurry}$$

The implement described above can include a solidification apparatus in the form of a rack-and-prongs rake structure with a multiplicity of hollow tubes each feeding the alkaline slurry to the tines. Pozzolanic materials rather than cementitious materials may be used to solidify the neutralized waste in order to minimize the formation of significant quantities of ettringite, an expansive compound that forms when calcium aluminate reacts with calcium sulfate to form hexacalcium aluminate trisulfate hydrate. Once the acidic waste within a contaminated site sub-section is neutralized and solidified, the solid waste is extracted, disposed of accordingly, and the process is repeated until the site is no longer contaminated with acidic waste, as described in FIG. 2.

As various modifications could be made in the constructions and methods herein described and illustrated without departing from the scope of the invention, it is intended that all matter contained in the foregoing description or shown in the accompanying drawings shall be interpreted as illustrative rather than limiting. The breadth and scope of the present invention should not be limited by any of the above-described exemplary embodiments, but should be defined only in accordance with the following claims appended hereto and their equivalents. All patent and non-patent documents cited in this specification are incorporated herein by reference in their entireties.

What is claimed:

1. A method of remediating acidic waste products in media at a contaminated site, said method comprising:
   measuring acidity of the waste at the contaminated site;
   mapping measured acidity levels of multiple, distinct sub-plots of the contaminated site;
   calculating an amount of neutralization agent to raise the pH of the waste in the sub-plots to a pH range of 4.0 to 12.5;
   applying a first amount of neutralization agent to a first sub-plot of the contaminated site;
   mixing the first amount of neutralization agent into the first sub-plot of the contaminated site at a first depth;
   repeating applying and mixing at the first sub-plot of the contaminated site from the first depth to a first maximum depth;
   applying a second amount of neutralization agent to a second sub-plot of the contaminated site;
   mixing the second amount of neutralization agent into the second sub-plot of the contaminated site at a second first depth;
   repeating applying and mixing at the second sub-plot of the contaminated site from the second first depth to a second maximum depth; and
   neutralizing the pH of the acidic waste products in media at the contaminated site.

2. The method according to claim 1, further comprising applying neutralizing agent on top of the first sub-plot before mixing.

3. The method according to claim 1, wherein sub-plots include a surface area less than about 10,000 square feet.

4. The method according to claim 1, wherein the neutralization agent includes an alkaline slurry.

5. The method according to claim 1, further comprising measuring the moisture content of the waste.

6. The method according to claim 1, further comprising measuring the density of the waste.

7. The method according to claim 1, further comprising mixing a first amount of a pozzolanic or cementitious material into the pH neutralized waste at the contaminated site, thereby solidifying at least the pH neutralized first portion of the contaminated site.

8. The method according to claim 7, wherein the first amount of pozzolanic or cementitious material is a function of the moisture content and density of the neutralized waste.

9. The method according to claim 7, further comprising extracting the solidified pH neutralized first portion of the contaminated site.

10. The method according to claim 4, wherein the alkaline slurry comprises hydrated lime $(Ca(OH)_2)$.

11. A method of reducing sulfur dioxide emissions from acidic waste in media at a contaminated site, said method comprising:
    measuring acidity of the acidic waste at a contaminated site;
    mapping measured acidity levels of multiple, distinct sub-plots of the contaminated site;
    applying a first amount of neutralization agent on top of a first sub-plot of the contaminated site, the first amount being determined as a function of the mapped acidity level at the first sub-plot of the contaminated site;
    forming at least one groove at a first depth into the first sub-plot of the contaminated site while simultaneously applying a second amount of neutralization agent, the second amount being determined as a function of the mapped acidity level at the first sub-plot of the contaminated site;
    repeating forming while simultaneously applying at the first sub-plot of the contaminated site from the first depth to a first maximum depth; and
    neutralizing the pH of the first sub-plot of the contaminated site.

12. The method according to claim 11, wherein the neutralization agent includes an alkaline slurry.

13. The method according to claim 11, further comprising measuring the moisture content of the waste.

14. The method according to claim 13, further comprising measuring the density of the waste.

15. The method according to claim 14, further comprising mixing a first amount of a pozzolanic or cementitious material into at least the pH neutralized acidic waste of the contaminated site, thereby solidifying the pH neutralized waste of the contaminated site.

16. The method according to claim 15, wherein the first amount of pozzolanic or cementitious material is a function of the moisture content and density of the waste.

17. The method according to claim 15, further comprising extracting the solidified pH neutralized waste of the contaminated site.

18. The method according to claim 12, wherein the alkaline slurry comprises hydrated lime $(Ca(OH)_2)$.

* * * * *